Feb. 18, 1941.          H. T. BATTIN                2,232,091
                   POWER TRANSMISSION MECHANISM
                        Filed May 16, 1940
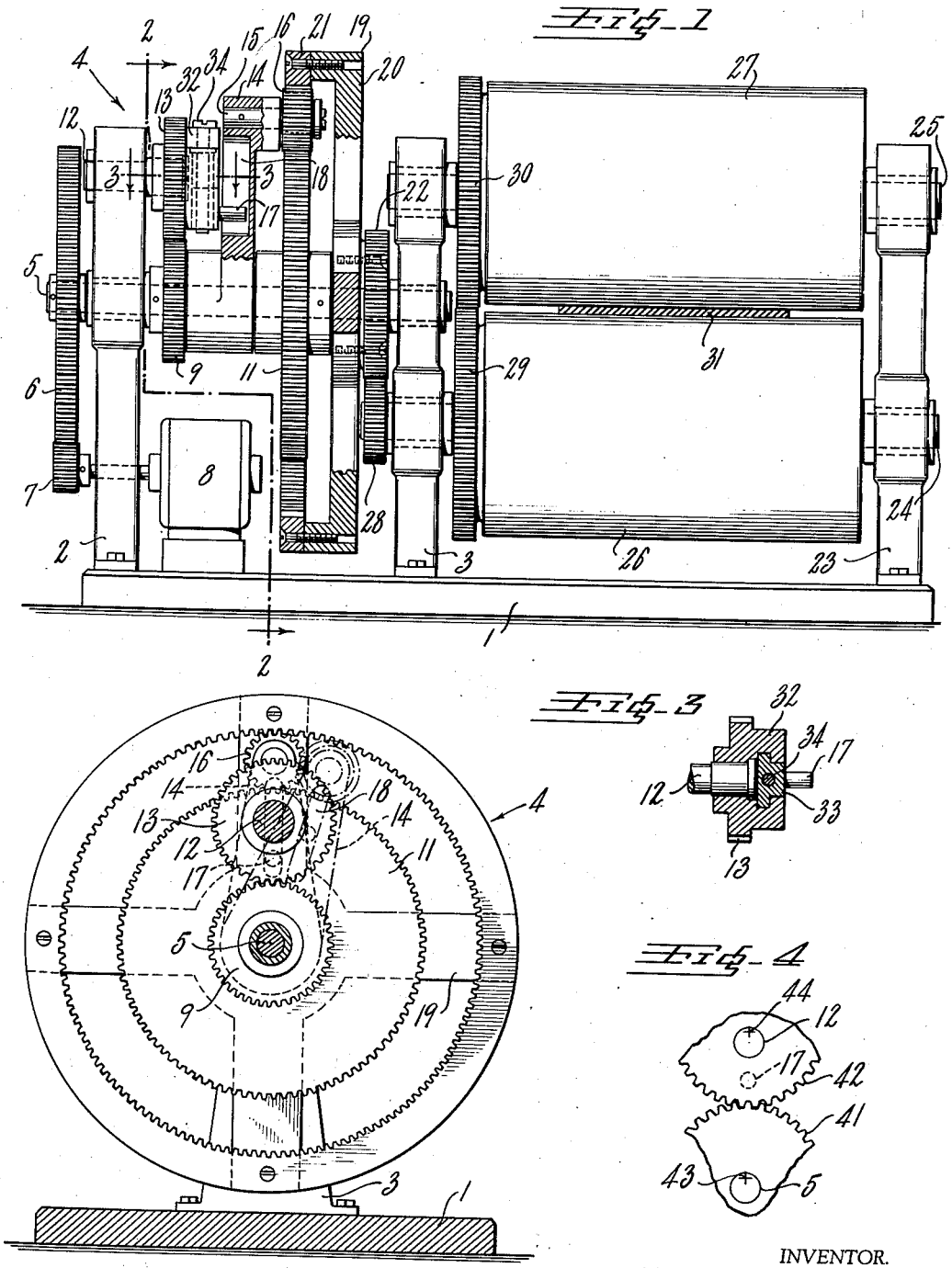
INVENTOR.
HAROLD T. BATTIN
BY
ATTORNEY Patented Feb. 18, 1941

2,232,091

UNITED STATES PATENT OFFICE 2,232,091

POWER TRANSMISSION MECHANISM

Harold T. Battin, Ridgewood, N. J., assignor to United States Rubber Company, New York, N. Y., a corporation of New Jersey Application May 16, 1940, Serial No. 335,475

7 Claims. (Cl. 74—394)

This invention relates to power transmitting and driving mechanisms for feed rolls and the like. More particularly it relates to driving mechanisms constructed and arranged for transforming constant speeds of rotary motion, as derived from conventional sources of power, into variable speeds or into intermittent variable speeds dependent upon the particular purpose for which the feed rolls are to be used.

Heretofore, many and varied clutch and cam mechanisms have been employed in conjunction with shearing machines, punch presses and the like, for actuating the feed rolls thereof for advancing stock through the machine at varying speeds or by predetermined increments of travel during or between the successive operations of the machines. While these mechanisms of former construction have functioned satisfactorily under some conditions of operation, they have failed to give satisfactory results at other times and during other conditions of use. For example, when it was desired to use a driving mechanism having a friction clutch, even slight variations in the amount of slippage between the clutch elements materially affected the accuracy of the machine. In other cases where positive clutches were employed, the sudden stopping and starting of the feed rolls operating at high speed often caused slippage between the stock and the rolls and accordingly caused inaccurate positioning of the stock during its processing. The harshness of these operations at high speeds often produced excessive wear in the operating parts and this wear also materially affected the accuracy of the machine. When it was attempted to cushion parts of the mechanism by springs or other resilient means, and thus lessen this wear the exact uniformity desired in the finished article produced by the machine could not be properly maintained.

The driving mechanism of this invention, however, is so constructed and arranged that uniform rotary motion derived from a conventional source of power may be easily and accurately transformed into a predetermined operating cycle which comprises a combination of accelerating and decelerating forward motions, or a combination of such forward motions separated by "rest" or "stop" periods, or a combination of forward and reverse motions separated by "rest" periods. These variations in motions produced by the driving mechanism of this invention are accomplished by a combination of constantly intermeshed parts or elements so that there is at all times a positive engagement therebetween insuring proper timing and exactness of operation regardless of the speed at which the mechanism is operated. This positive engagement accordingly places each and every portion of each operating cycle of the mechanism under the exact control of the operator of the machine. The construction and arrangement of the structure is such that only substantially uniform acceleration and deceleration are produced by the mechanism and thus the harshness, experienced in devices of former construction from sudden starting and stopping, is avoided.

This invention will be more readily understood from the following description when taken in conjunction with the accompanying drawing, in which:

Fig. 1 shows a side elevational view, partly in cross section and partly broken away, of a preferred embodiment of the driving mechanism of this invention as applied to a pair of stock advancing feed rolls;

Fig. 2 is a transverse cross sectional view taken substantially on line 2—2 of Fig. 1;

Fig. 3 is a cross sectional view of another portion of the mechanism taken substantially on line 3—3 of Fig. 1; and Fig. 4 is a partial diagrammatic view of a slightly modified form of timing gears which may be employed in the driving mechanism of Fig. 1.

Referring to the accompanying drawing in detail, Fig. 1 shows a supporting base 1 to which vertically extending frames or brackets 2 and 3 are firmly secured for supporting the various parts of a variable speed driving mechanism generally indicated by the numeral 4. This mechanism comprises in part a main drive shaft 5 rotatably mounted in the frames 2 and 3 and arranged with one of its ends extending beyond the frame 2 so as to receive a gear 6 which meshes with a gear 7 secured upon the shaft of a conventional electric motor or similar source of power 8. A timing gear 9 and a driving gear 11 are positioned upon the shaft 5 between frames 2 and 3 and are keyed to this shaft and rotate therewith.

Positioned in an upper part of the frame 2 is a fixed shaft 12 upon the inner end of which is rotatably mounted a second timing gear 13 arranged in meshing engagement with the gear 9. Positioned upon the main shaft 5 and intermediately of the gears 9 and 11 is a control arm 14 which is arranged for free swinging movement thereon and carries at its outer end a stub shaft 15 upon which is rotatably mounted an intermediate or pinion gear 16. The pinion 16 is arranged to engage the gear 11 at all times and under all conditions of operating of the mechanism. A transverse swinging or oscillating movement of the control arm 14 about the drive shaft 5 is governed by a timing or control pin 17 eccentrically and adjustably mounted upon the gear 13 in a manner to be hereinafter described. The pin 17 is arranged to extend into a slot 18 formed in the control arm 14.

Also carried upon the drive shaft 5 for free pivotal movement relative thereto is a driven gear 19 comprising a supporting hub portion 20 and an internally toothed ring portion 21 so arranged as to engage the pinion 16 and to be driven thereby. A power transmitting gear 22 is secured concentrically to the side of the driven gear 19 and rotates therewith independently of the rotation of the shaft 5.

Arranged upon the supporting base 1 in alignment with the frames 2 and 3 is an additional frame 23. This frame 23 and the frame 3 are each provided with a pair of vertically spaced bearings for rotatably supporting the opposite ends of a pair of shafts 24 and 25 upon which are mounted a pair of stock advancing feed rolls 26 and 27, respectively. The inner free end of the shaft 24 is arranged to extend beyond the frame 3 and receive a gear 28 which meshes with the gear 22 so that power from the variable speed mechanism 4 may be transmitted to the shaft 24. A pair of gears 29 and 30 are located upon the shafts 24 and 25 adjacent the feed rolls 26 and 27, respectively, for transmitting power to these rolls and causing them to operate simultaneously. A strip of stock to be actuated by the feed rolls 26 and 27 is indicated by the numeral 31.

A device for radially adjusting the control pin 17 relative to the axis of the timing gear 13 is shown upon a side of this gear in Fig. 1 and comprises a guide block 32 in which is arranged a radially extending T-shaped guideway for slidably retaining and positioning a guide shoe 33. The pin 17 is fixedly secured in this shoe 33 and has a free end portion thereof extending parallel to the axis of the gear 13 and into the slot 18 formed in the control arm 14. An adjusting screw 34 is rotatably positioned in the block 32 and has threaded engagement with the shoe 33 so that the shoe and control pin may be readily moved toward or away from the center of the gear 13, depending upon the amplitude desired in the control arm 14 during operation of the mechanism.

During operation of the preferred form of the variable speed driving mechanism shown by Figs. 1–3, a uniform rotary motion derived from the electric motor 8 is transmitted through the shaft 5 to the timing gear 9 and driving gear 11 so that these gears operate at a uniform speed. The timing gear 9 serves to transmit a similar motion to the second timing gear 13 thereby causing the control pin 17 to be moved in a circular path about and at a predetermined distance from the axis of the gear 13. This rotary motion of the pin 17 in engagement with the slot 18 causes the arm 14 to pivot on the shaft 5 and swing alternately to opposite sides of the axis of the gear 13 thus causing the intermediate gear 16 to roll alternately in opposite directions along the periphery of the driving gear 11. As the gear 11 is rotated at a uniform speed and the intermediate gear 16 is at the same time moved back and forth by the arm 14, it will be seen that a composite motion is given to the intermediate gear 16. As the gear 16 is always in engagement with the driven gear 19, rotation of the gear 19 is directly responsive to the composite rotational movement of the gear 16. This composite motion of the gear 19 is in turn transmitted through the gears 22 and 28 and finally to the gears 29 and 30 for operating the rolls 26 and 27 simultaneously in a predetermined manner.

By proportioning the ratio of the gears 9, 11, 13 and 16, the relative speeds of rotation of the gears 11 and 16 can be so controlled that the driven gear 19 can be caused to rotate at variable forward speeds, or caused to rotate at variable forward speeds between successive rest periods, or even caused to rotate forwardly, stop, reverse and then stop again during each successive operating cycle.

When the rolls 26 and 27 are caused to rotate by the variable speed mechanism of Figs. 1–3, the strip 31 will be moved forwardly a predetermined distance and then caused to stop by a substantially uniformly decelerating motion and will be held stationary momentarily while a shearing machine, or the like (not shown), performs an operation upon the strip before the stock is again moved forwardly a predetermined amount by a substantially uniformly accelerating motion, completing one cycle of operation of the mechanism. Such a shearing machine, as just referred to, could be readily synchronized with the feed rolls in any well known manner. As the rolls 26 and 27 are substantially uniformly accelerated and decelerated, the stock has less tendency to slip relative to the rolls and consequently greater speeds can be employed.

The radial adjustment of the control pin 17 by means of the screw 34 towards or away from the center of the gear 13 allows a substantial variation in the amplitude of the control arm 14. By this adjustment the duration of the stop periods relative to the periods of motion of each cycle of operation of the mechanism can be increased or decreased appreciably.

In Fig. 4 a slightly modified form of timing gears is shown which may be readily employed as a part of the invention. These gears, indicated by the numerals 41 and 42, are eccentrically mounted upon the shaft 5 and shaft 12, respectively, in place of the timing gears 9 and 13, shown in the preferred embodiment of the invention. The gear 41 is keyed to the shaft 5 so as to rotate therewith while the gear 42 is rotatably carried upon the fixed shaft 12. As will be clearly seen in Fig. 4, the true center of the gear 41, as indicated by the numeral 43, and the true center of the gear 42, as indicated by the numeral 44, are each located a slight distance above the centers of the respective shafts 5 and 12. These gears are thus arranged to intermesh with each other at all times during operation of the mechanism and transmit a slightly accelerating and decelerating rotary motion to the pin 17 adjustably carried upon the side of the gear 42 in a manner similar to that already described in the preferred embodiment.

Such a variable motion as that derived from the eccentric gears 41 and 42 can be combined by the gears 11 and 16 to further modify the variable motion transmitted to the gear 19, if desired, and thus give to the operator of the machine greater control over a particular part of the operating cycle of the machine; such as increasing the stop period of the mechanism.

It will be readily apparent to those skilled in the art that, while the gear ratios of the several parts of my structure are such that they produce an operating cycle in which the feed rolls are caused to move forwardly and then come to a complete stop and then move forwardly again to constitute an operating cycle of the mechanism, other gear ratios in the parts of my driving mechanism can be employed for producing various predetermined conditions of operation.

Thus it will be seen from the foregoing descriptions of the mechanisms of this invention that a uniform speed of rotary motion, as derived from a conventional source of power, can be transferred into a variable motion for operating feed rolls, and the like, in a step by step manner without the sudden and harsh starting and stopping actions generally accompanying conventional types of mechanisms employed for such purpose. As all parts of the structure of this invention are at all times in positive interlocking engagement with each other, the mechanism always maintains its proper predetermined timing or cycle of operation and thus better and more uniform results can be obtained from punch presses, shearing machines and the like using the mechanism of this invention than have been available heretofore when mechanisms of former constructions were employed.

While I have shown and described preferred embodiments of my invention arranged to operate in conjunction with the stock advancing feed rolls of a shearing machine, punch press, or the like, it should be clearly understood that such is merely by way of illustration of a use of the invention and that the invention may as readily be employed for other purposes and in various machines wherever it is desirous of controlling the rotating or reciprocating movements or the intermittent starting and stopping of operating parts thereof. It will also be readily apparent to those skilled in the art that certain changes may be made in the various parts of the mechanisms of this invention without departing from the essence thereof or the spirit and scope of the appended claims.

Having thus described my invention, what I claim and desire to protect by Letters Patent is:

1. A power transmitting mechanism comprising a drive shaft having a driving gear secured thereto, a rotatably mounted driven gear, an intermediate gear operatively inter-connecting said driving and driven gears for transmitting rotary motion from the former to the latter, and means operatively connected to said intermediate gear and responsive to rotary motion of said drive shaft for varying the speed of rotation of said intermediate gear relative to said driving gear and thereby varying the speed of rotation of the driven gear operated thereby.

2. A power transmitting mechanism comprising a drive shaft having a driving gear secured thereto, a rotatably mounted driven gear, an intermediate gear meshing with said driving and driven gears for transmitting rotary motion from the former to the latter, and means operatively connected to said intermediate gear and responsive to the rotary motion of said drive shaft for circumferentially varying the location of said intermediate gear relative to the periphery of said driving gear and thereby varying the speed of rotation of the driven gear relative to said driving gear.

3. A power transmitting mechanism comprising a drive shaft having a driving gear and a timing gear secured thereto, a rotatably mounted driven gear, an intermediate gear meshing with said driving and driven gears for transmitting rotary motion from the former to the latter, and means operatively inter-connecting said intermediate gear and said timing gear for varying the speed of rotation of said intermediate gear relative to the driving gear and thereby varying the speed of rotation of the driven gear.

4. A power transmitting mechanism comprising a drive shaft having a driving gear and a timing gear secured thereto, a rotatably mounted driven gear, an intermediate gear meshing with said driving and driven gears for transmitting power from the former to the latter, a second timing gear meshing with the first timing gear and mounted to rotate about a relatively fixed axis, and means operatively connected to the said second timing gear and said intermediate gear for varying a speed of rotation of said intermediate gear relative to the speed of rotation of the driving gear and thereby varying the speed of rotation of the driven gear.

5. A power transmitting mechanism comprising a drive shaft having a driving gear and a timing gear secured thereto, a driven gear rotatably mounted relative thereto, a pinion gear meshing with said driving and driven gears for transmitting rotary motion from the former to the latter, a second timing gear meshing with the first timing gear and mounted for rotation about a relatively fixed axis, and means operatively connected to said second timing gear and said pinion gear for varying the speed of rotation of said pinion gear relative to the speed of rotation of the driving gear and thereby varying the speed of rotation of the driven gear, said means comprising a control arm pivotally mounted for swinging movement about the axis of said drive shaft and having a stub shaft carried thereby for rotatably supporting said pinion gear, and an operative connection between said second timing gear and said arm for oscillating said arm and said pinion gear about the axis of the drive shaft during rotation of said timing gears.

6. A power transmitting mechanism comprising a drive shaft having a driving gear and a timing gear secured thereto, a driven gear rotatably mounted relative thereto, a pinion gear meshing with said driving and driven gears for transmitting rotary motion from the former to the latter, a second timing gear meshing with the first timing gear and mounted for rotation about a relatively fixed axis, and means operatively connected to said second timing gear and said pinion gear for varying the speed of rotation of said pinion gear relative to the speed of rotation of the driving gear and thereby varying the speed of rotation of the driven gear, said means comprising a control arm pivotally mounted for swinging movement about the axis of said drive shaft and having a stub shaft carried thereby for rotatably supporting said pinion gear, and an operative connection between said second timing gear and said arm for oscillating said arm and said pinion gear about the axis of the drive shaft during rotation of said timing gears, said operating connection being adjustable for varying the amplitude of said arm and pinion gear to thereby vary the timing of the various parts of the operating cycle of the mechanism.

7. A power transmitting mechanism comprising a drive shaft having a driving gear and a timing gear secured thereto, a driven gear rotatably mounted relative thereto, a pinion gear meshing with said driving and driven gears for transmitting rotary motion from the former to the latter, a second timing gear meshing with the first time gear and mounted for rotation about a relatively fixed axis, and means operatively connected to said second timing gear and said pinion gear for varying the speed of rotation of said pinion gear relative to the speed of rotation of the driving gear and thereby varying the speed of rotation of the driven gear, said means comprising a control arm pivotally mounted for swinging movement about the axis of said drive shaft and having a stub shaft carried thereby for rotatably supporting said pinion gear, and an operative connection between said second timing gear and said arm for oscillating said arm and said pinion gear about the axis of the drive shaft during rotation of said timing gears, said timing gears being eccentrically mounted whereby the speed of oscillation of the control arm may be varied.

HAROLD T. BATTIN.